April 14, 1925.  H. O. HEM  1,533,113

DOUBLE PENDULUM SCALE

Filed Dec. 26, 1919  3 Sheets-Sheet 1

Witness
C. E. Wilcox

Inventor
Halvor O. Hem.
By George R. Frye
Attorney

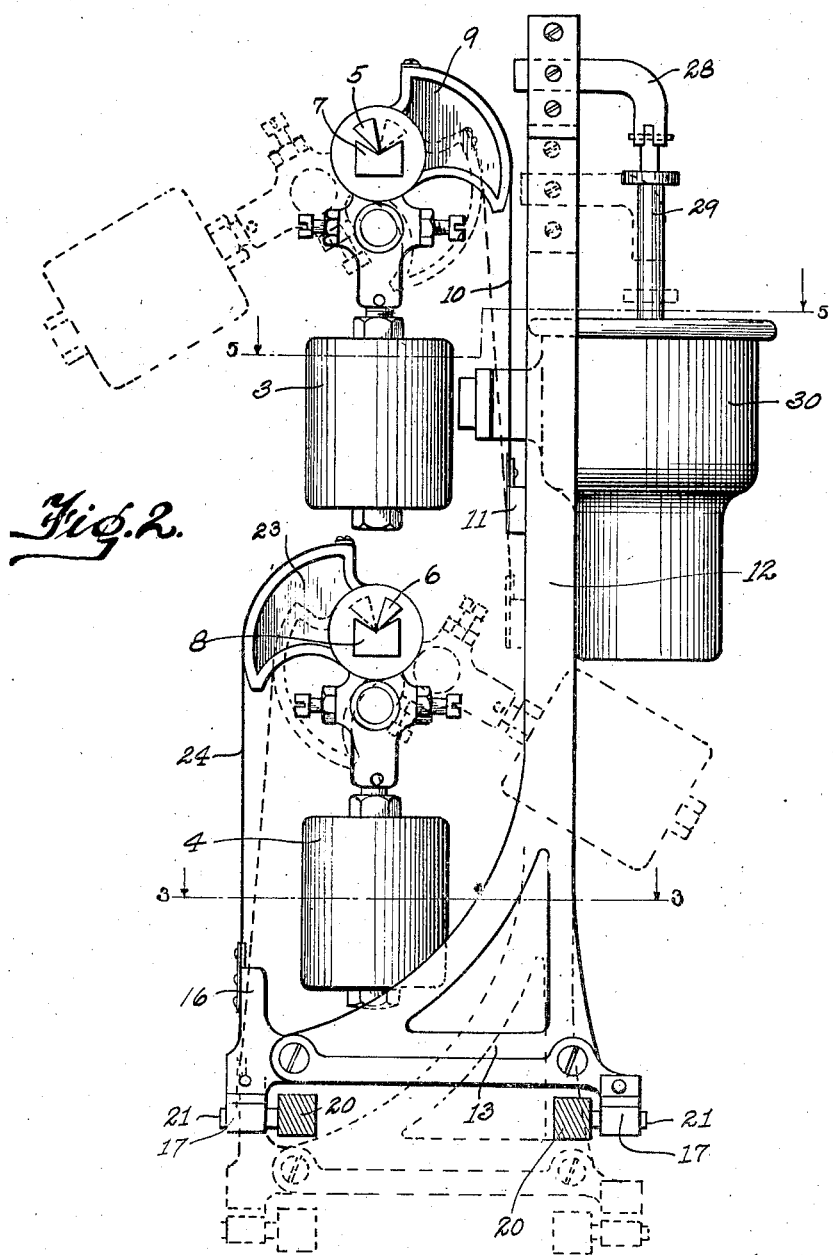

April 14, 1925.  1,533,113
H. O. HEM
DOUBLE PENDULUM SCALE
Filed Dec. 26, 1919   3 Sheets-Sheet 3
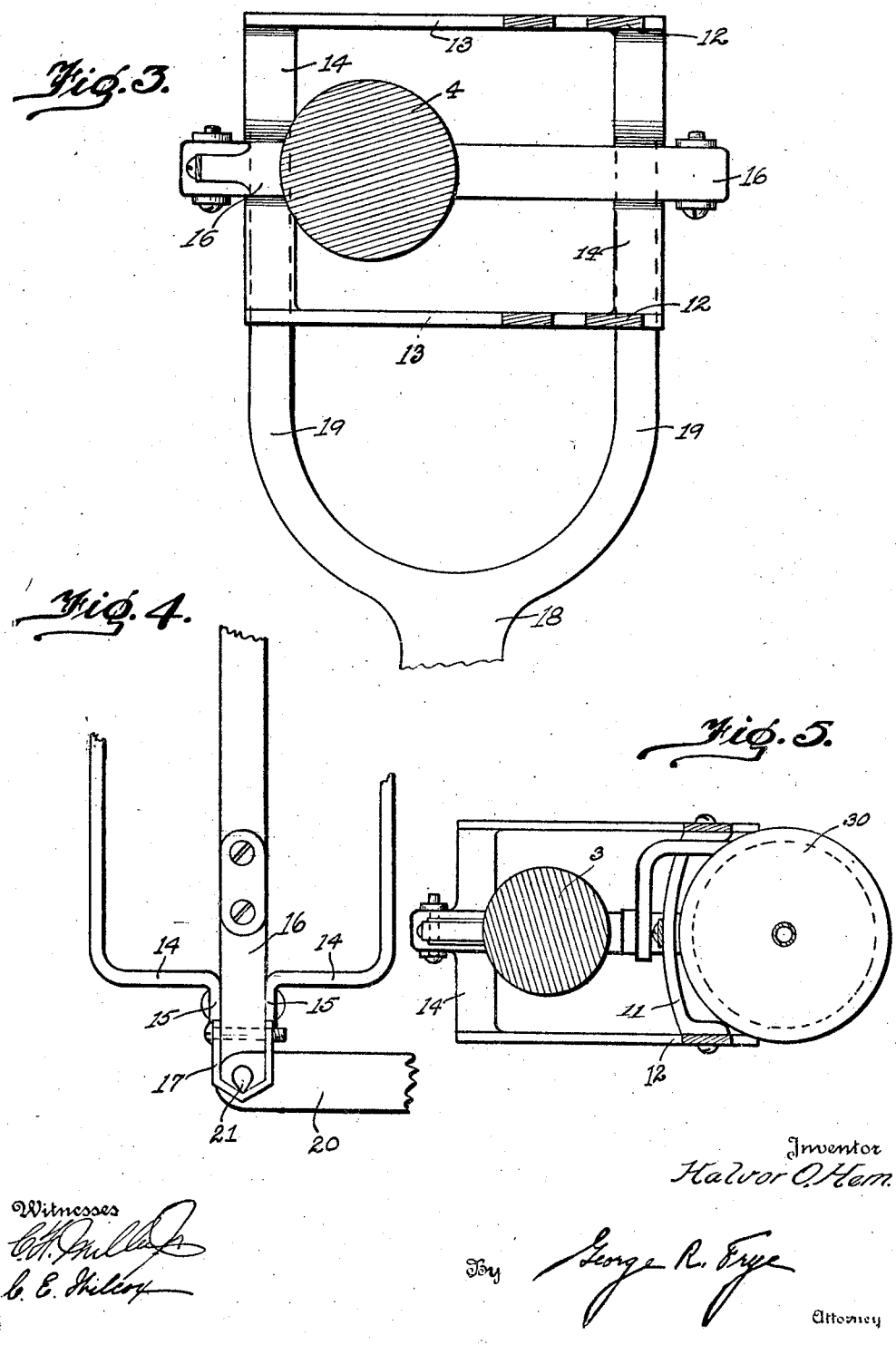

Patented Apr. 14, 1925.

1,533,113

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

DOUBLE-PENDULUM SCALE.

Application filed December 26, 1919. Serial No. 347,430.

*To all whom it may concern:*

Be it known that I, HALVOR O. HEM, a citizen of the United States, residing at Toledo, in the county of Lucas and State of Ohio, have invented certain new and useful Improvements in Double-Pendulum Scales, of which the following is a specification.

This invention relates to weighing scales in which the load on the platform is offset by swinging counterpoises or pendulums, and has for its principal object the provision of a compact scale of this type in which the counterbalancing mechanism is not deranged when the scale is thrown out of level.

Another object is the provision of a pendulum scale having a fan-shaped chart and compensating pendulums, one of which is directly connected to the indicator moving over the chart.

Another object is to so connect the dash pot plunger to the weighing mechanism that it may move substantially rectilinearly and without tendency to bind.

Still another object is to connect the dash pot plunger to the scale lever through the knife edge pivots employed in connecting the lever to the counterbalancing mechanism.

Other objects and advantages will be apparent from the following description, in which reference is had to the accompanying drawings illustrating a preferred embodiment of my invention and in which similar reference numerals designate similar parts throughout the several views.

In the drawings:—

Figure 2 is an enlarged elevation of the load-offsetting mechanism shown in Figure 1;

Figure 3 is a horizontal section taken substantially on the line 3—3 of Figure 2;

Figure 4 is an elevation showing a portion of the connection between the platform lever mechanism and the load-offsetting mechanism; and Figure 5 is a horizontal sectional view taken substantially on the line 5—5 of Figure 2.

Figure 1:
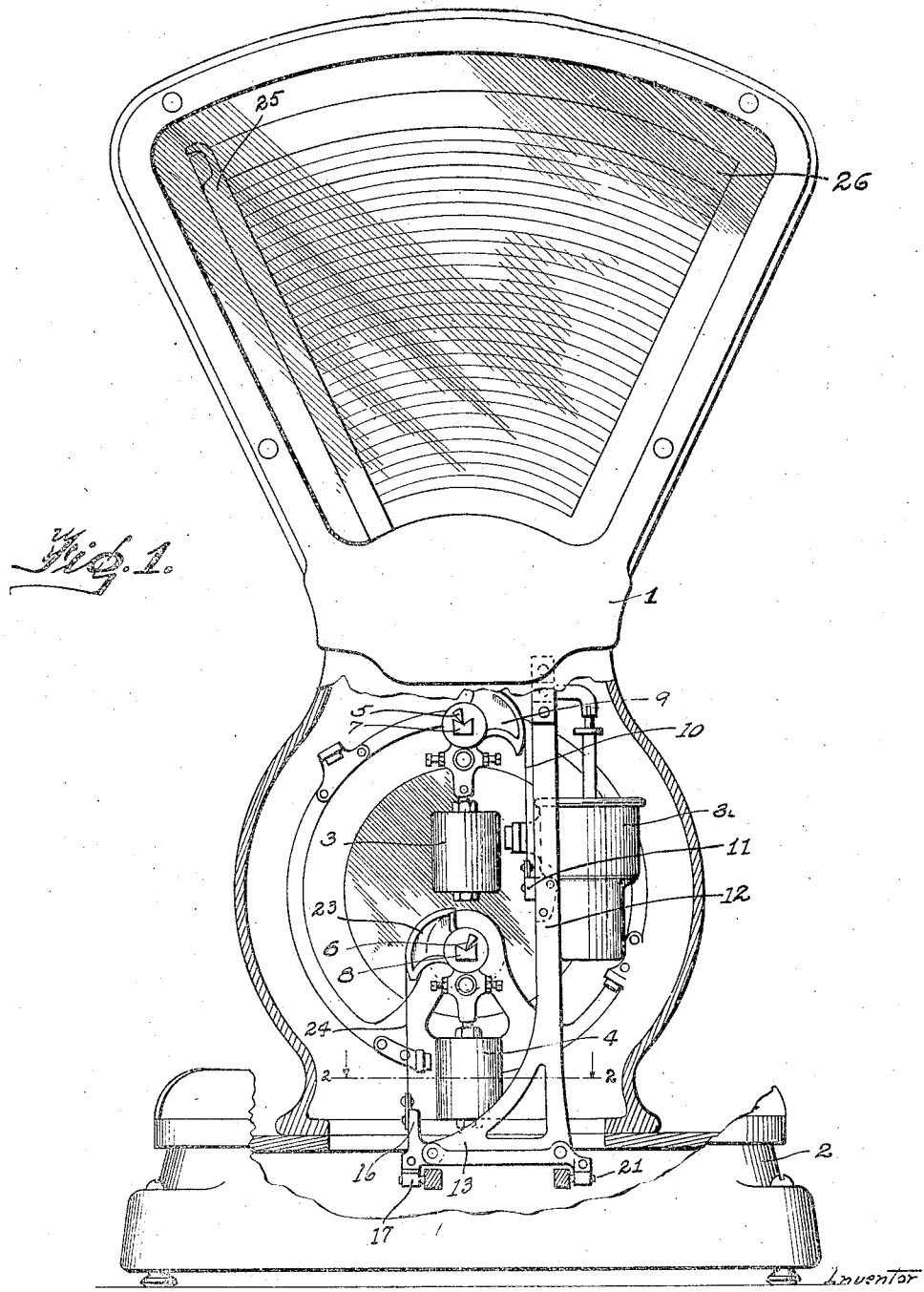
Figure 1 is a front elevation of a scale embodying my invention, part of the housing being broken away to show the load-offsetting mechanism.

Referring to the drawings in detail, the pendulum load-offsetting mechanism and indicating mechanism of the scale are contained in an upright housing 1, the upper portion of which is substantially fan-shaped, the lower portion thereof being similar in shape to the case of a watch. The upright housing 1 is carried upon the base housing 2, which contains the platform lever mechanism of the scale. The lower or watch casing-shaped portion of the upright housing 1 contains the load-offsetting mechanism, which consists of oppositely-swinging pendulums 3 and 4 mounted one above the other on knife-edge pivots 5 and 6 which are supported in bearings 7 and 8. The bearings 8 which support the lower pendulum 4 are mounted in brackets extending upwardly into the watch-casing portion of the housing 1, and the bearings 7 supporting the upper pendulum 3 are mounted in brackets (not shown) which extend downwardly into the casing. Rigid with the upper pendulum 3 is an eccentric power sector 9 to which is secured the upper end of the flexible steel band or ribbon 10. The ribbon 10 passes over the curved face of the sector 9 and extends downwardly, its lower end being connected to the crossbar 11 which is secured to upright members 12 of a suspended frame, the said frame serving to connect the platform lever mechanism of the scale to the pendulum mechanism and to a dash pot shock-absorbing device. The uprights 12 are substantially parallel throughout the major portions of their lengths, and are provided at their lower ends with lateral extensions or feet 13. From the lower edges of the feet 13 horizontal bars 14 extend toward each other, the adjacent ends of the bars 14 being turned downwardly, as at 15, and secured respectively to opposite sides of a bracket 16. At each end of the bracket member 16 is carried a bearing member 17, the bearing members being secured to the bracket 16 by means of pins so that they are free to swing laterally to a limited extent. The rear end of the main platform lever 18 is bifurcated, as at 19, so that the nose 20 of the lever is in effect broadened, while its weight is not appreciably increased. Knife-edge pivots 21 project from the nose 20 and are rockably carried in the bearings 17.

Rigid with the lower pendulum 3 is an eccentric power sector 23 to which is secured the upper end of a flexible steel band or ribbon 24. The ribbon 24 extends downwardly over the curved face of the power sector 23 and is secured at its lower end to the bracket 16.

An index 25 is rigidly connected to the upper pendulum 3 and extends upwardly into the fan-shaped portion of the housing 1, in which is displayed a chart 26 over which the index 25 is adapted to swing when the pendulum load-offsetting mechanism is displaced by a load on the scale platform. Since the rear end of the platform lever is suspended by both the ribbons 10 and 24 and since the pendulums swing oppositely, tilting the scale in either direction will have an opposite effect on each of the pendulums. Assuming that the pendulums are in weighing position (shown in dotted lines in Figure 2), if the scale be tilted to the right, the pull of the pendulum 4 upon the platform lever will decrease and the pull of the pendulum 3 will increase in the same degree so that the position of the indicator hand will remain unchanged. When the pendulum mechanism is in the position shown in full lines in Figure 2, there is sufficient initial pull upon the ribbons 10 and 24 so that the scale may be tilted slightly without causing any change in the relative position of the pendulums. If the scale be tilted, for example, to the right, the tension of the ribbon 24 will be slightly decreased, while the tension of the ribbon 10 will be increased to the same extent, the resultant pull upon the nose of the platform lever remaining constant.

Secured between the upper ends of the uprights 12 is a block, from one side of which projects an elbow member 28 and pivoted to the depending end of the member 28 is the upper end of the dash pot plunger rod 29, the lower end of which is secured to a plunger mounted to reciprocate in the dash pot 30. The connection between the dash pot plunger and the main lever of the scale is therefore through the knife-edge pivots 21, and owing to the comparatively great length of the uprights 12 the plunger may reciprocate substantially vertically, thus obviating any tendency of the plunger or plunger rod to bind against any portion of the dash pot.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a lever, a pair of oppositely-swinging pendulums arranged one over the other, and operative connections from said lever to said pendulums.

2. In a weighing scale, in combination, a lever, a pair of oppositely-swinging pendulums mounted on knife-edge pivots, the corresponding pivots being in the same vertical plane, and connections from said lever to said pivots.

3. In a weighing scale, in combination, a pair of oppositely-swinging pendulums, an upright frame, a connection from said frame to one of said pendulums, a lateral extension on said frame, a connection from said lateral extension to the other of said pendulums, and a lever connected to said frame.

4. In a weighing scale, in combination, a lever having a bifurcated end, aligned pivots on the bifurcations of said lever, and oppositely-swinging pendulums connected to said pivots.

5. In a weighing scale, in combination, a lever, spaced aligned pivots on said lever, a frame, spaced aligned bearings on said frame receiving said pivots, and a pair of pendulums connected respectively to opposite sides of said frame.

6. In a weighing scale, in combination, a lever, spaced aligned pivots on said lever, a frame, spaced aligned bearings on said frame receiving said pivots, and a pair of pendulums connected respectively to opposite sides of said frame, said pendulums being mounted one above the other.

7. In a weighing scale, in combination, a lever, load-offsetting mechanism, a shock-absorbing device, and a floating frame connecting said lever, load-offsetting mechanism and shock-absorbing device.

8. In a weighing scale, in combination, a lever, a pair of oppositely-swinging pendulums, a shock-absorbing device, a floating frame, said frame comprising an upright portion connected to said dash pot and one of said pendulums, and a laterally-extending foot connected to said lever and the other of said pendulums.

9. In a weighing scale, in combination, a pair of pendulums arranged one above the other, oppositely-extending power sectors on said pendulums, ribbons secured to and overlying said power sectors, and a lever connected to said ribbons.

10. In a weighing scale, in combination, a pair of pendulums arranged one above the other, oppositely-extending power sectors on said pendulums, ribbons secured to and overlying said power sectors, an upright frame suspended by said ribbons, and a lever connected to said frame.

11. In a weighing scale, in combination, a pair of pendulums arranged one above the other, oppositely-extending power sectors on said pendulums, ribbons secured to and overlying said power sectors, an upright frame suspended by said ribbons, a lever connected through knife-edge pivots to said frame, and a dash pot shock absorber connected to said frame.

HALVOR O. HEM.

Witnesses:
C. O. MARSHALL,
FRANCES DOYLE.